Figure 1:
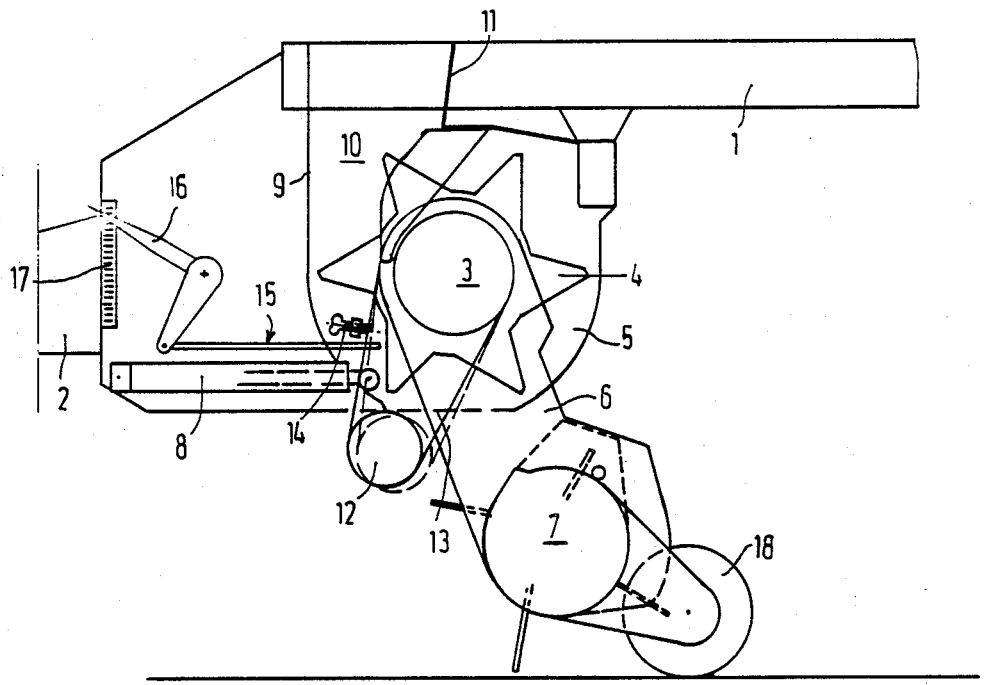

United States Patent [19]

Schuitemaker

[11] Patent Number: 4,921,391
[45] Date of Patent: May 1, 1990

[54] FEEDING MECHANISM FOR A PICK-UP TRAILER

[76] Inventor: Johannes Schuitemaker, Stationsdwarsweg 65, 7461 AS Rijssen, Netherlands

[21] Appl. No.: 283,790

[22] Filed: Dec. 13, 1988

[30] Foreign Application Priority Data

Dec. 16, 1987 [NL] Netherlands ............... 8703050

[51] Int. Cl.⁵ .................... B60P 1/16; A01D 35/26
[52] U.S. Cl. ................... 414/505; 198/511; 198/518; 56/341; 56/364
[58] Field of Search ........... 414/501, 502, 503, 504, 414/505, 507, 518; 56/341, 364; 198/511, 518

[56] References Cited

U.S. PATENT DOCUMENTS

| | | | |
|---|---|---|---|
| 3,470,681 | 10/1969 | Saemann | 198/511 X |
| 3,545,185 | 12/1970 | Whitfield et al. | 56/364 X |
| 3,572,022 | 3/1971 | Smith | 56/364 X |
| 3,595,363 | 7/1971 | Vinyard | 414/502 X |
| 3,754,388 | 8/1973 | Neely, Jr. | 414/505 X |
| 3,837,157 | 9/1974 | Van Der Lely | 56/364 X |
| 3,999,674 | 12/1976 | Meitl | 414/501 X |
| 4,356,687 | 2/1982 | Lesslhumer | 198/518 X |
| 4,479,347 | 10/1984 | Larsen et al. | 414/502 |
| 4,732,332 | 3/1988 | Schuitemaker . | |

FOREIGN PATENT DOCUMENTS

| | | | |
|---|---|---|---|
| 241884 | 8/1965 | Austria | 56/364 |
| 243176 | 10/1965 | Austria | 414/504 |
| 250245 | 10/1966 | Austria | 414/502 |
| 607677 | 11/1960 | Canada | 414/501 |
| 74533 | 3/1983 | European Pat. Off. | 414/501 |
| 1207694 | 12/1965 | Fed. Rep. of Germany | 414/502 |
| 1800157 | 4/1970 | Fed. Rep. of Germany | 414/502 |
| 1582459 | 9/1970 | Fed. Rep. of Germany | 56/364 |
| 2242994 | 3/1974 | Fed. Rep. of Germany | 414/501 |
| 2444609 | 4/1976 | Fed. Rep. of Germany | 56/364 |
| 154598 | 12/1980 | Fed. Rep. of Germany | 56/364 |
| 651681 | 1/1963 | Italy | 414/502 |
| 741828 | 12/1955 | United Kingdom . | |
| 2055557 | 3/1981 | United Kingdom . | |
| 2066204 | 7/1981 | United Kingdom | 414/518 |

OTHER PUBLICATIONS

Schuitemaker Rapide Opraapwagen–May 1987.

Primary Examiner—Frank E. Werner
Assistant Examiner—Robert S. Katz
Attorney, Agent, or Firm—Brooks Haidt Haffner & Delahunty

[57] ABSTRACT

A pick-up trailer comprising a feeding mechanism composed of a pick-up (7) and a rotor (4) linking up therewith in downstream direction, and partly surrounded by a guide plate (9), thereby producing a guide channel (10) between the rotor and the guide plate. The guide channel (10), at the end opposite pick-up (7) is bounded in the downward direction by a rotary roller (12) and terminates at the top in a bottom opening of the trailer. The roller (12) as well as shaft (3) are mounted for rotation between side plates (5) attached to the bottom (1) of the trailer. The arrangement is characterized in that the rotary roller (12) is attached to separate, adjustable suspension arms (13) mounted for rotation to the shaft (3) of the rotor.

5 Claims, 1 Drawing Sheet

FEEDING MECHANISM FOR A PICK-UP TRAILER

This invention relates to a pick-up trailer comprising a feeding mechanism composed of a pick-up, a conveyor wheel or rotor located in front of the pick-up with respect to the normal direction of forward motion of the trailer of said pick-up and bounded on one side and possibly partly on the other side by a guiding surface, the guide channel thus formed terminating in the bottom of the pick-up trailer, and wherein, at the guide wall opposite the pick-up, there is provided a rotary roller bounding the intake opening of the guide channel.

A drawback of such a known construction is that the roller is mounted fixedly on the frame, so that the ground clearance is small and the trailer, consequently, cannot travel over a silage pile without additional provisions. Such additional provisions may consist in constructing the drawbar of the pick-up trailer as a hydraulically operated folding drawbar, which however renders the apparatus considerably more expensive, while moreover the movement of the folding drawbar is time-consuming.

Another problem formed by a fixed roller is that the distance between the roller and the pick-up is always the same, in other words, the apparatus is unsuitable for handling both short-fibred and long-fibred products.

It is an object of the present invention to remove these drawbacks.

To that effect, according to the invention, an apparatus of the above described type is characterized in that, at the underside of the guide wall, opposite the pick-up, there is arranged a rotary roller attached to two suspension arms the other end of which is mounted for rotation on the shaft mounting the rotor.

The opening formed between the pick-up and the said rotary roller can be adjusted by means of adjusting screws disposed between the suspension arms of the attachment plates for the rotor shaft and the suspension arms for the rotary roller.

For the purpose of checking the size of this opening from the tractor, a pointer with a graduated scale may be provided at a place visible from the tractor, which pointer is connected to the suspension arms for the rotary roller.

In a further elaboration of the present invention, for the purpose of operating the above described apparatus, the height of the pick-up can be set in known manner by adjustable wheels and the rotary roller is adjustable by means of the said adjusting screws and/or the piston-and-cylinder assemblies.

Furthermore, the pick-up can be arranged to be swivelled upwards by means of the said rotary roller by operation of the piston-and-cylinder assemblies.

Figure 2:
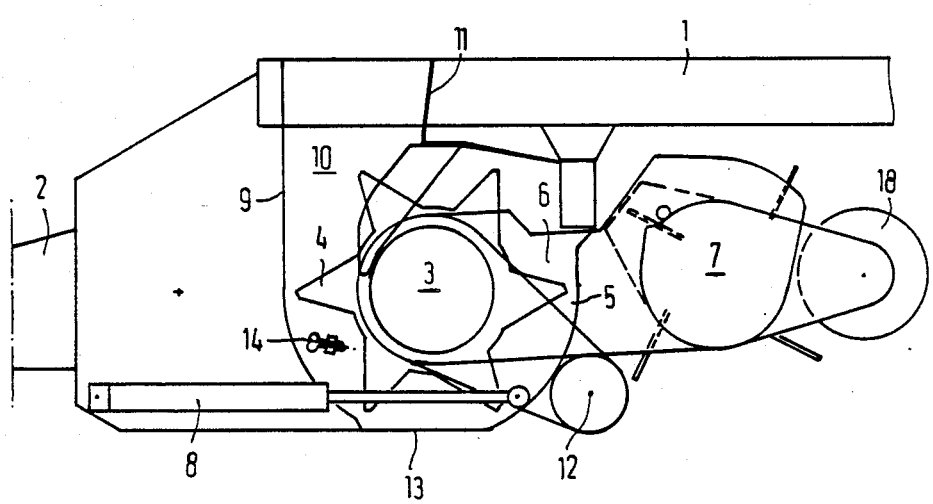

One embodiment of the feeding mechanism of a pick-up trailer according to the present invention will now be described, by way of example, with reference to the accompanying drawings, in which:

FIG. 1 is a diagrammatic side view of a feeding mechanism of a pick-up trailer in the operating position; and FIG. 2 is a diagrammatic view of the apparatus similar to FIG. 1 but showing the inoperative position of the feeding mechanism.

According to the drawings, which essentially only show the loading platform 1 and the drawbar 2 of the pick-up trailer, the vehicle is provided at the front, in known manner, with a shaft 3 with a rotor 4 mounted thereon, journalled in side plates 5 attached to the underside of the loading platform 1. Mounted for rotation about shaft 3 are pick-up plates 6, which carry a pick-up 7 with wheels 18. As these elements are known per se, they will not be further discussed herein. By rotation of the pick-up plates 6 toward the rear, the mechanism moves from the position shown in FIG. 1 to that shown in FIG. 2. For this purpose the pick-up plates 6 are mounted laterally inward of suspension arms 6A mounted for rotation laterally within the fixed plates 13. Thus, the pair of pick-up plates 6 are within the pair of rotatably mounted suspension arms 6A, which in turn are laterally inward of the fixed plates 13. At the front, the rotor or conveyor wheel 4 is surrounded by a fixed guide plate 9 which, together with the rotor and a superposed fixed guide plate 11, bounds a guide channel 10. Thus material picked up by the pick-up 7 is fed between the plates 6 to the channel 10, guided by the lower guide plate 9 and the upper guide plate 11 into an opening in the trailer bottom, passing the rotor 4 in the course of forward and upward travel. This kind of material feeding has been generally described in my prior U.S. Pat. No. 4,732,332, but the device shown in that prior patent lacks certain advantageous features of the present invention. Unlike the device shown in my prior patent, the channel 10 of the present invention is bounded from below by a guide roller. Near the lower edge of guide plate 9, there is provided a guide roller 12 suspended in swingable suspension arms 6A, the other end of which is mounted for rotation about shaft 3, said plates being adjustable by piston-and-cylinder assemblies 8. Roller 12 is adjustable by means of adjusting screws 14 attached to side plates 5. Thus, the opening between the pick-up and the guide roller 12 can be set or adjusted to the length of the produce to be loaded. FIG. 1 shows how the adjusting screw acts as an adjustable stop against which the leading edge of the suspension arm 6A abuts when the device is in position for picking up of material as shown. The roller 12, mounted on the suspension arms 6A is thus held the desired distance from the pick-up 7. Dotted lines in FIG. 1 illustrate how this spacing can be made smaller by advancing the screws 14.

In order to allow the pick-up to be lifted entirely, thereby increasing the ground clearance and facilitating the travel of the trailer over silage piles, side plates 13 are arranged outwardly of pick-up plates 6, so that the rotary guide roller 12 comes to lie ahead of pick-up plates 6. By operating side plates 13 by means of piston-and-cylinder assembly 8, the side plates, the guide roller 12 and hence the pick-up 7 can move from the position shown in FIG. 1 to that shown in FIG. 2. As shown in FIG. 2, the rotary roller 12, as well as the pick-up, have been moved upward and rearward with respect to the direction of trailer motion, the rotary roller 12 in this condition being to the rear of the rotor 4. This provides the desired ground clearance, when, for example the tractor encounters an upward slope.

In order for the operator to be able to observe the position of the pick-up from the tractor, one of the side plates 13 from which guide roller 12 is suspended may be provided with a linkage 15 including a pointer 16 which can move relatively to a graduated scale 17, and can be observed to read the correct position of rotary roller 12.

Naturally, modifications may be made without departing from the scope of the present invention.

I claim:

1. A pick-up trailer for travel on the ground and picking up products comprising, a feeding mechanism composed of a pick-up and a rotor which includes a shaft, said rotor being located in front of the pick-up with respect to the normal direction of forward motion of the trailer, said pick-up being attached to said rotor by pick-up plates, said rotor being partly surrounded by a fixed guide plate thereby producing a guide channel between said rotor and said guide plate, said guide channel being bounded from below by a rotary roller when said pick-up is in an operative position and terminating at the top in an opening in a bottom of the trailer, said pick-up comprising means to feed said products toward said guide channel, said rotor and shaft being mounted for rotation inwardly of and between fixed side plates attached to the bottom of the trailer, said rotary roller is mounted for rotation and is attached between suspension arms, said suspension arms are mounted for rotation on the shaft of the rotor for moving said rotary roller, and said suspension arms being movable whereby said roller can be moved from said operative position which bounds said channel from below to a second position away from said channel for greater clearance between said roller and the ground when said pick-up is in operation.

2. A pick-up trailer as claimed in claim 1, wherein the suspension arms between which said rotary roller is arranged are provided laterally outwardly of pick-up plates of said pick-up.

3. A pick-up trailer as claimed in claim 1 or 2, wherein the movement of the suspension arms of said rotary roller is controlled by piston-and-cylinder assemblies.

4. A pick-up trailer as claimed in claim 1 or 2 and including an indicator connected through a linkage to said suspension arms.

5. A pick-up trailer as claimed in claim 1 or 2 wherein the rotary roller is adjustable relative to said fixed side plates by means of adjusting screws.

* * * * *